US006082628A

United States Patent [19]

Hutchins

[11] Patent Number: 6,082,628

[45] Date of Patent: Jul. 4, 2000

[54] POWDER CHARGER AND SPRAYER

[75] Inventor: Darrell K. Hutchins, Conway, Ark.

[73] Assignee: Board of Trustees of the University of Arkansas, Little Rock, Ark.

[21] Appl. No.: 09/312,455

[22] Filed: May 14, 1999

[51] Int. Cl.[7] .............................. A01G 23/10; B05B 3/00

[52] U.S. Cl. ................................ 239/3; 239/696; 239/706

[58] Field of Search ................................ 239/3, 690, 696, 239/697, 704, 706, 692

[56] References Cited

U.S. PATENT DOCUMENTS

| | | | |
|---|---|---|---|
| 3,659,151 | 4/1972 | Fabre | 239/3 |
| 3,767,116 | 10/1973 | Clausen et al. | 239/696 |
| 3,791,579 | 2/1974 | Cowan | 239/3 |
| 4,377,603 | 3/1983 | Itoh et al. . | |
| 4,779,564 | 10/1988 | Keifer et al. . | |
| 4,991,774 | 2/1991 | Kelly . | |
| 5,012,195 | 4/1991 | Harrold . | |
| 5,378,957 | 1/1995 | Kelly . | |
| 5,622,313 | 4/1997 | Lader et al. . | |
| 5,749,529 | 5/1998 | Kazama et al. . | |
| 5,765,761 | 6/1998 | Law et al. . | |
| 5,924,631 | 7/1999 | Rodrigues et al. | 239/3 |

OTHER PUBLICATIONS

Colbert, "Modern Coating Technology," Noyes Data Corporation (USA), p. 222–227.

Garner et al., "Electrostatic Painting of Plastics I: Electrical Properties of Plastics and Primers," Journal of Coatings Technology, vol. 63 (No. 803), p. 33–37, (Dec. 6, 1991).

Elmoursi et al., "Electrostatic Painting of Plastics II: Electric Field Effects," Journal of Coatings Technology, vol. 64 (No. 805), p. 39–44, (Feb. 6, 1992).

Soules et al., "Optical Properties of Powder Coatings," Journal of the Illuminating Engineering Society, p. 92–100, (May 6, 1988).

Banerjee et al., "Adhesion of Charged Powders on Metal Surface in Powder Coating Process," IEEE, p. 1897–1901, (May 6, 1993).

Meyer III, "The Electrostatics of Powder Coatings—Still a Mystery?," Proceedings of the ACE Division of Polymeric Materials:Science and Engineering, American Chemical Society, p. 220–21, (May 6, 1992).

Chen, "Modeling of Powder Paint Partical Trajectory in Electrostatic Painting," University of Arkansas at Little Rock (thesis) (USA), p. 1–17, (May 6, 1997).

Hughes, et al., "Electrostatic Powder Coating," Research Studies Press Ltd. (England), p. 61–89, (May 6, 1984).

Masuda, "Theoretical Characteristics of Standing–Wave Electric Curtains," Electrical Engineering in Japan, vol. 93, No. 1, pp. 41–53 (1973).

*Primary Examiner*—Lesley D. Morris
*Assistant Examiner*—Jorge Bocanegra
*Attorney, Agent, or Firm*—J. Charles Dougherty

[57] ABSTRACT

A powder spray gun, and method for using same, is disclosed. The powder gun includes a corona discharge tip and mesh screen within the passage for powder flow. A potential is applied to the corona discharge tip, resulting in an electric field between the corona discharge tip and mesh screen. This electric field efficiently charges powder particles passing through the spray gun, but the mesh screen blocks most of the free ions that are generated by the corona discharge tip. Any free ions that pass through the mesh screen are captured by a conductive end piece on the spray gun. A potential difference is applied between the end of the spray gun and the workpiece to guide the charged powder particles to the workpiece.

12 Claims, 4 Drawing Sheets

POWDER CHARGER AND SPRAYER

BACKGROUND OF THE INVENTION

The present invention is directed to a system for charging and spraying aerosolized powders for use in powder spray painting and other powder spray applications. In particular, the present invention is directed to a system for generating a flow of charged powder particles to a workpiece with no significant free ion current flowing between the sprayer head and workpiece, while providing efficient, consistent charging of powder particles.

It is well known in the art that the electrostatic charging of powder particles can result in improved coating efficiency in powder painting applications. One method of particle charging, used in a number of prior art devices, is tribocharging. Such devices are generally described in Chapter 3 of J. F. Hughes, *Electrostatic Powder Coating* (Research Studies Press Ltd. 1984), which is incorporated herein by reference. Tribocharging is a method of charging powder particles through friction with the various surfaces that the particles impact as they travel. For example, powder particles may collide with surfaces within the spray gun itself, such as the spray gun barrel, and may also collide with the walls of the hose connecting the spray gun to the aerosolized powder source. As the powder particles impact these surfaces, frictional forces cause the particle to become charged. Tribocharging results in an opposite electrical charge being deposited on the surface that is contacted.

The tribocharging method has the advantage of requiring no external power supply to charge the powder. Also, since no high-voltage power source is used, no free ions will be created that flow from the spray gun to the workpiece. Free ions flowing to the workpiece damage the smooth surface of powder paint being applied. Also, a free flow of ions can cause a dangerous electrostatic buildup that may eventually result in an electrostatic discharge due to back ionization. Such discharges back from the workpiece to the spray gun may injure the person operating the sprayer, and may otherwise damage the spraying equipment and ruin the powder coating being applied. Considerable research has been conducted in recent years to decrease the resistivity of powders used in powder spray painting applications because of this problem. If a powder with greater conductivity is used, then the free ion charge can bleed to the workpiece and the back ionization problem is reduced. These efforts are unnecessary when tribocharging guns are used.

Tribocharging spray guns also have disadvantages, however. Since there is no electric field between the spray gun and the workpiece in such devices, powder is driven to the workpiece only by the air flow pattern from the sprayer. Thus a significant percentage of the powder will be deposited on the floor of the spray area or on other surfaces other than the workpiece, thus requiring more powder for each application. Also, because of the opposite polarities of powder particles and surfaces inside tribocharging spray guns, powder tends to collect on these surfaces, which reduces the tribocharging effect of the gun as operation continues. This “filming” effect can eventually result in a spray gun that imparts virtually no charge whatsoever to the powder particles being sprayed. This latter disadvantage is believed to be why spray guns that rely exclusively on tribocharging are rarely in use today.

A second method of charging powder particles in a spray gun is to use a corona discharge source in conjunction with the gun. In a typical example, an electrically charged needle is added within the spray gun’s barrel. The needle functions as a corona discharge electrode. As the powder passes the tip of the needle, it enters a strong electric field, which causes the powder particles to become charged by ion deposition on the particles. Since this method does not rely on tribocharging effects to charge the powder particles, it is not hampered by filming during prolonged use. However, there are also disadvantages of this method. Since the workpiece in corona discharge systems is functioning as the ground electrode for the corona discharge tip, all of the voltage drop must take place between the discharge tip and the workpiece. The spray gun may be quite far from the workpiece during many spray painting applications. Therefore, a very high voltage is necessary to generate a sufficient electric field within the spray gun barrel to sufficiently charge the powder particles. Also, because of the high voltage drop between the corona discharge source and the workpiece, a large current of free ions flows from the spray gun to the workpiece. This flow of free ions can result in back ionization, which may not only destroy the smooth flow of paint onto the workpiece, but can, as explained above, be hazardous to the spray gun operator and equipment as well.

A third approach is to combine tribocharging and active corona discharge effects into a single gun. A spray gun that utilizes both tribocharging and corona discharge effects will suffer the disadvantages of both; it will gradually lose its ability to fully charge powder particles as a film of powder builds up on the surfaces that the powder contacts, and it will also generate free ion flow that can result in back ionization.

A combined tribocharging/corona discharge system has been developed using a tribocharging gun with a passive corona discharge effect. In this gun, the buildup of charge on the interior surfaces of the spray gun due to tribocharging results in an opposite charge buildup on a corona discharge needle mounted within the spray gun’s barrel. Since this charge buildup is due to tribocharging effects, no high-voltage power supply is required. This gun would thus not suffer from the back ionization dangers of conventional corona discharge guns, but would still suffer from the effects of filming that plague traditional tribocharging guns.

U.S. Pat. No. 5,622,313, to Lader et al., discloses a triboelectric powder spray gun that uses a corona discharge needle to discharge the charge buildup on the gun barrel’s interior surfaces. The device attempts to solve the problem commonly encountered with tribocharging guns, namely, how to discharge the charge buildup within the gun barrel without discharging the charge on the powder particles being sprayed onto the workpiece. The Lader device attempts to do this by periodically pulsing on and off a corona discharge tip with an opposite polarity to the charge buildup on the interior of the spray gun barrel. This pulsed corona discharge tip eliminates the need for a ground electrode to discharge the barrel’s interior contact surfaces. However, since the pulse from the corona discharge tip would also discharge charged powder particles within the spray gun, it could not be activated while charged powder is flowing without adversely affecting the charging of powder particles flowing through the spray gun.

Yet another spray gun design is the low-voltage corona discharge gun. In this device, a conventional corona discharge tip is fitted within the barrel of the gun. Just downstream from the discharge tip is an additional ground electrode in the shape of a ring or washer. This ground electrode replaces the workpiece as the ground in the system. Since the ground in this type of gun is much closer to the discharge tip than in a conventional corona discharge gun, the voltage applied to the corona discharge tip to effect a certain level of charge in the powder particles can be much lower. A reduction in operating voltage from about 80 kV in a traditional corona discharge gun down to about 6 kV for a low-voltage gun is typical. Thus a smaller, lower-cost voltage supply can be used for these guns. Also, since the space within which the powder is charged is confined to a small area within the barrel of the spray gun itself, the efficiency of the charging process is greatly increased.

Although Hughes claims that there is no free ion flow from a low-voltage spray gun to the workpiece, experiments have shown that this statement is not accurate. While perhaps some of the free ion flow strikes the ground electrode and thus does not travel beyond the spray gun, a significant free ion flow current still flows from the low-voltage gun to the workpiece. This device therefore still suffers from the back ionization problems of conventional corona discharge spray guns, although the severity of this problem may be somewhat reduced.

Another disadvantage of the low-voltage gun is the voltage drop between the spray gun and the workpiece. A voltage drop between the spray gun and workpiece is desired because the electric field thus created will guide charged particles to the workpiece, increasing the efficiency of the coating operation. There is some voltage drop between the low-voltage gun and workpiece due to charge that builds up within the insulated spray gun barrel (and the diffuser, if present, at the end of the barrel) downstream from the ground electrode. Because this charge builds up all along the barrel walls and the diffuser, the resulting electric field pattern is scattered, and does not efficiently direct charged particles to the workpiece. Also, since this electric field depends upon charge build-up within the spray gun, it is variable over time, and will not exist at all when the gun is first used. Thus the electric field between the spray gun and workpiece is not as steady and reliable as that produced by conventional high-voltage corona discharge guns. The overall result is that the powder spray process in the low-voltage gun is far less efficient than for the conventional high-voltage corona discharge guns, where the direct voltage drop between the gun and the workpiece serves to precisely guide the charged particles to their target.

Still another disadvantage of the low-voltage gun is that it does not efficiently charge particles that pass through the spray gun barrel. Due to the electric field pattern between the corona discharge tip and the ground electrode, the volume through which corona ion current flows is quite thin, running only from the tip to the upstream edge of the ground electrode ring. The field lines for this electric field run essentially perpendicular to the flow of powder through the spray gun, and thus the powder has only a brief opportunity to be charged. By contrast, a conventional high-voltage gun has electric field lines that run from the corona discharge tip to the workpiece, essentially parallel to the powder flow direction, such that the powder remains in the field in the presence of corona ions for a considerable time and is more efficiently charged.

As explained above, each of the prior art powder spray gun systems has certain disadvantages. It would be desirable to develop a spray gun that produced an electric field with a corresponding corona ion concentration that efficiently charged the powder particles passing through the spray gun's barrel; produced a smooth electric field between the spray gun and the workpiece to direct charged particles to the workpiece; maintained a constant charging efficiency over time without required periods of disuse for discharging; but did not produce a significant free ion flow between the spray gun and the workpiece.

SUMMARY OF THE INVENTION

The present invention overcomes the limitations of the prior art devices by preventing free ion flow from the spray gun but maintaining a constant electric field between the spray gun and workpiece. The present invention incorporates a corona discharge tip within the barrel of a spray gun. Downstream from the corona discharge tip is a mesh screen, rather than the annular ground electrode of the low-voltage spray gun. This mesh screen serves as the ground electrode in the present invention. The mesh screen stops the flow of the large majority of free ions that otherwise would pass from the spray gun to the workpiece, but allows the charged powder particles to pass through.

The present invention also includes a conducting end piece downstream from the mesh screen, through which the charged particles pass before exiting the spray gun. The conducting end piece thus serves as the downstream portion of the spray gun's barrel. Because a conducting end piece is used here rather than the insulating material used for the barrel of the low-voltage gun, there is no buildup of charge along the barrel walls; instead, any charge buildup will be transferred to the end of the spray gun barrel. Also, any stray free ions that might pass through the conducting mesh screen will be attracted to and stopped by the conductor.

The present invention also includes an external voltage applied between the spray gun and the workpiece. Since this external voltage creates an electric field between the spray gun and the workpiece, the charged particles are efficiently directed to the workpiece, instead of simply relying on airflow as done with conventional tribocharging devices. Also, because this external voltage source is not used to charge the corona discharge tip, the power supply used can be of much lower power than that used with traditional high-voltage corona discharge spray guns. In addition, since an external voltage source is used, the electric field is constant and reliable throughout the time the spray gun is in operation, unlike the variable electric field that is indirectly generated by the low-voltage gun between its barrel and the workpiece.

Because the present invention does not rely on tribocharging to charge powder particles, it does not suffer from the filming problems of tribocharging spray guns. There is no need for a periodic discharge of particles built up within the spray gun, as in the Lader device; such a build up would not affect charging in the present invention, and, moreover, since a conducting end piece is used downstream from the mesh screen, no buildup can occur along the end piece walls.

Like the low-voltage gun, the present invention requires only a relatively low-voltage power supply for the electrode tip, since the distance between the electrode tip and the mesh screen is quite short. This means that a smaller, cheaper power supply can be used with the present invention. Yet unlike the low-voltage gun, the present invention blocks the flow of practically all of the free ions that otherwise pass from the spray gun to the workpiece, thereby eliminating back ionization problems. As noted above, the concerns about back ionization have forced researchers to develop paint powders with decreased resistance, thereby sacrificing other qualities of the powders being used. By using the present invention, the resistance of the powder is relatively unimportant, and powder paint researchers can concentrate on developing powders with other desirable qualities, such as adherence strength and precisely controlled color characteristics.

In addition, the present invention provides significantly greater charging to the powder particles passing through the spray gun as compared to the low-voltage gun. The electric field lines between the corona discharge tip and the mesh screen run essentially parallel to the direction of powder flow through the spray gun. The greatest concentration of electric field lines is to the center of the mesh screen, which corresponds with the center of the flow path for the powder. Like any laminar flow device, the area of greatest powder flow in the present invention is the center of the passage. Likewise, the particles pass through the center of the passage with greater speed than along the walls. Thus the strongest electric field and corona ion concentration occur in the volume where the particle velocity and concentration are greatest, ensuring that all of the powder particles are sufficiently charged. By contrast, the low-voltage gun provides only a relatively thin volume where the electric field is of sufficient strength to charge the particles, and moreover, that field volume is thinnest near the center of the powder passage, where the greatest concentration of powder flows. Experiments have shown that the present invention provides on average three to four times better particle charging efficiency than the low-voltage gun.

It is therefore an object of the present invention to provide a powder spray gun that does not rely on tribocharging to charge powder particles.

It is a further object of the present invention to provide a powder spray gun with a constant electric field between the spray gun and the workpiece to guide charged powder particles to their target.

It is a further object of the present invention to provide a powder spray gun that does not require a periodic discharge of charge build-up within the spray gun to maintain operating efficiency It is a further object of the present invention to provide a powder spray gun with a relatively small, inexpensive power supply to provide power to the corona discharge tip.

It is a further object of the present invention to provide a powder spray gun that blocks the flow of free ions between the spray gun and the workpiece.

It is a further object of the present invention to provide a powder spray gun that efficiently charges powder particles passing through the barrel of the spray gun.

Further objects and advantages of the present invention will be apparent from a consideration of the following detailed description of the preferred embodiments in conjunction with the appended drawing as briefly described following.

DETAILED DESCRIPTION OF THE PREFERRED EMBODIMENTS

Figure 1:
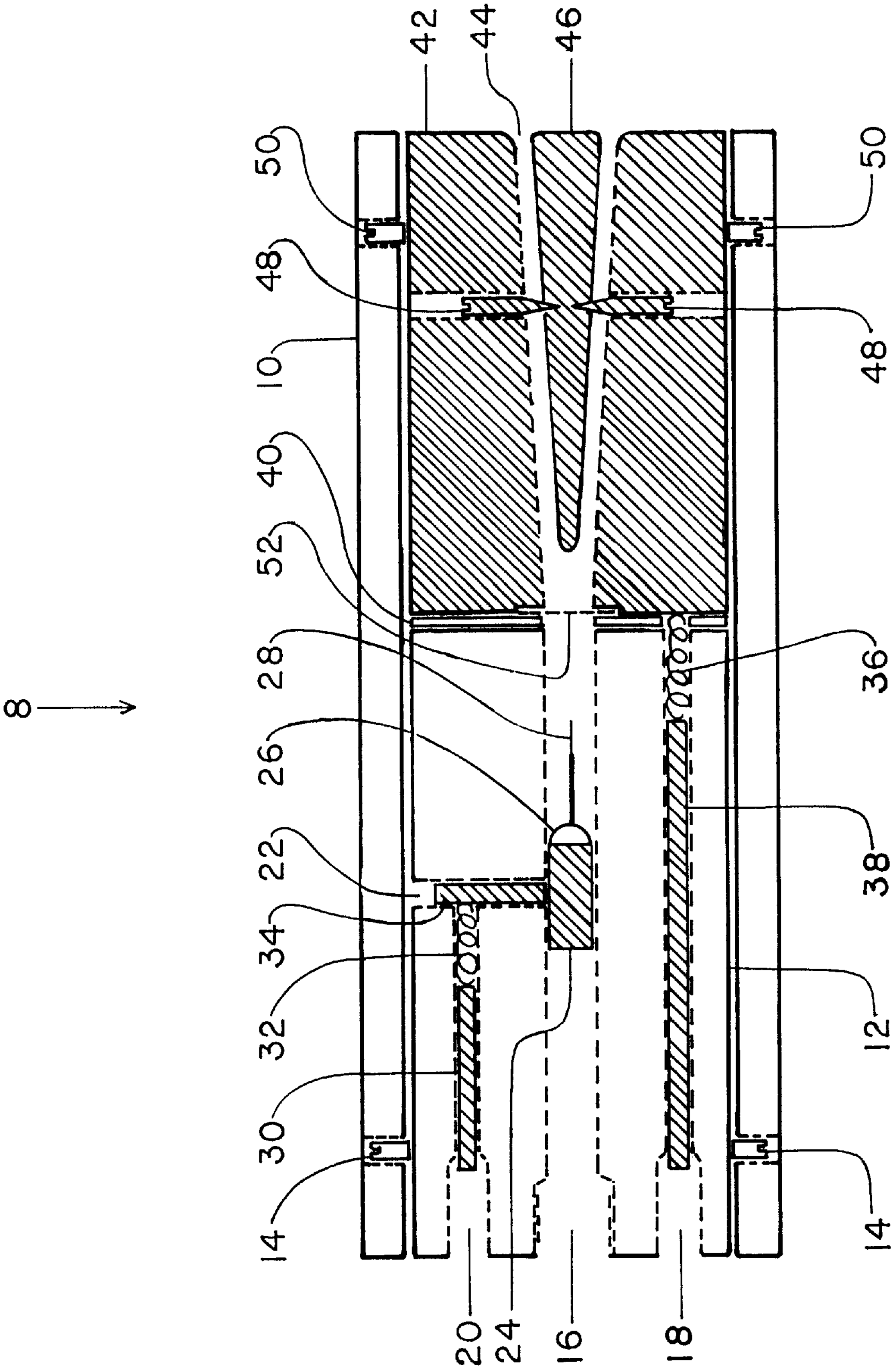
FIG. 1 is a cut-away elevational view of a preferred embodiment of the spray gun portion of the present invention.

Referring to FIG. 1, a preferred embodiment of the spray gun portion of the present invention is shown. Spray gun 8 includes sleeve 10, which generally serves as a housing. Sleeve 10 is tubular in shape. Sleeve 10 may be formed of any sufficiently rigid insulating material, such as Teflon, plastic, or fiberglass. Base 12, having a cylindrical shape, fits coaxially within sleeve 10 flush with its proximal edge. Base 12 is held in place by base set screws 14, which extend through sleeve 10 to make contact with base 12. Both base 12 and base set screws 14 are formed of an insulating material.

Base powder passage 16 extends longitudinally through base 12, with openings at both its proximal and distal end. Base powder passage 16 is preferably drawn along the longitudinal axis through the center of base 12. Base powder passage 16 is of a sufficient diameter to provide the required flow of aerosolized powder through spray gun 8. End piece contact passage 18 also passes entirely through base 12. Longitudinal corona contact passage 20 extends partially through base 12 in a longitudinal direction, and intersects transverse corona contact passage 22, which forms an opening between the side of base 12 and base powder passage 16.

Corona tube 24 is annular in shape, with an outside diameter roughly equal to the diameter of base powder passage 16. Attached to the distal end of corona tube 24 is corona loop 26. Extending in a distal direction from corona loop 26 is corona electrode 28. Each of corona tube 24, corona loop 26, and corona electrode 28 are formed of a conducting material, such as steel or copper. Any other sufficiently rigid, conductive material may be used to form corona tube 24, corona loop 26, and corona electrode 28.

Longitudinal corona rod 30 extends through longitudinal corona contact passage 20 and makes contact with longitudinal corona spring 32, which extends through the remainder of longitudinal corona contact passage 20. Longitudinal corona spring 32 contacts transverse corona rod 34, which extends through transverse corona contact passage 22 and makes contact with corona tube 24. End piece rod 38 extends through end piece contact passage 18 and makes contact with end piece spring 36, which extends through the remainder of end piece contact passage 18. Each of longitudinal corona rod 30, longitudinal corona spring 32, transverse corona rod 34, end piece spring 36, and end piece rod 38 are also constructed of a conductive material.

A gasket 40 fits inside sleeve 10 of spray gun 8 against the distal end of base 12. Gasket 40 is preferably of rubber or Teflon, but can be formed of any other elastic material. End piece 42 fits concentrically within sleeve 10 with its proximal end against gasket 40 and its distal end even with the distal end of sleeve 10. End piece 42 also contacts end piece spring 36. End piece 42 is held in place by end piece set screws 50.

End piece powder passage 44 passes longitudinally through end piece 42, and is aligned with base powder passage 16. Preferably, end piece powder passage 44 is conical, with a larger diameter at its distal end, but may also be of equal diameter along its length, or any other shapes that would allow sufficient powder flow. Baffle 46, which is preferably of a roughly conical shape, fits within the distal end of end piece powder passage 44, and is held in place by baffle set screws 48 which pass through end piece 42. Mesh screen 52 is fitted to end piece 42 at its proximal end, such that mesh screen 52 covers the proximal entrance to end piece powder passage 44. End piece 42, baffle 46, baffle set screws 48, and mesh screen 52 are all constructed of a conducting material, and are all in electrical contact with each other. End piece set screws 50 are constructed of an insulating material, and may be of the same design as base set screws 14.

Figure 2:
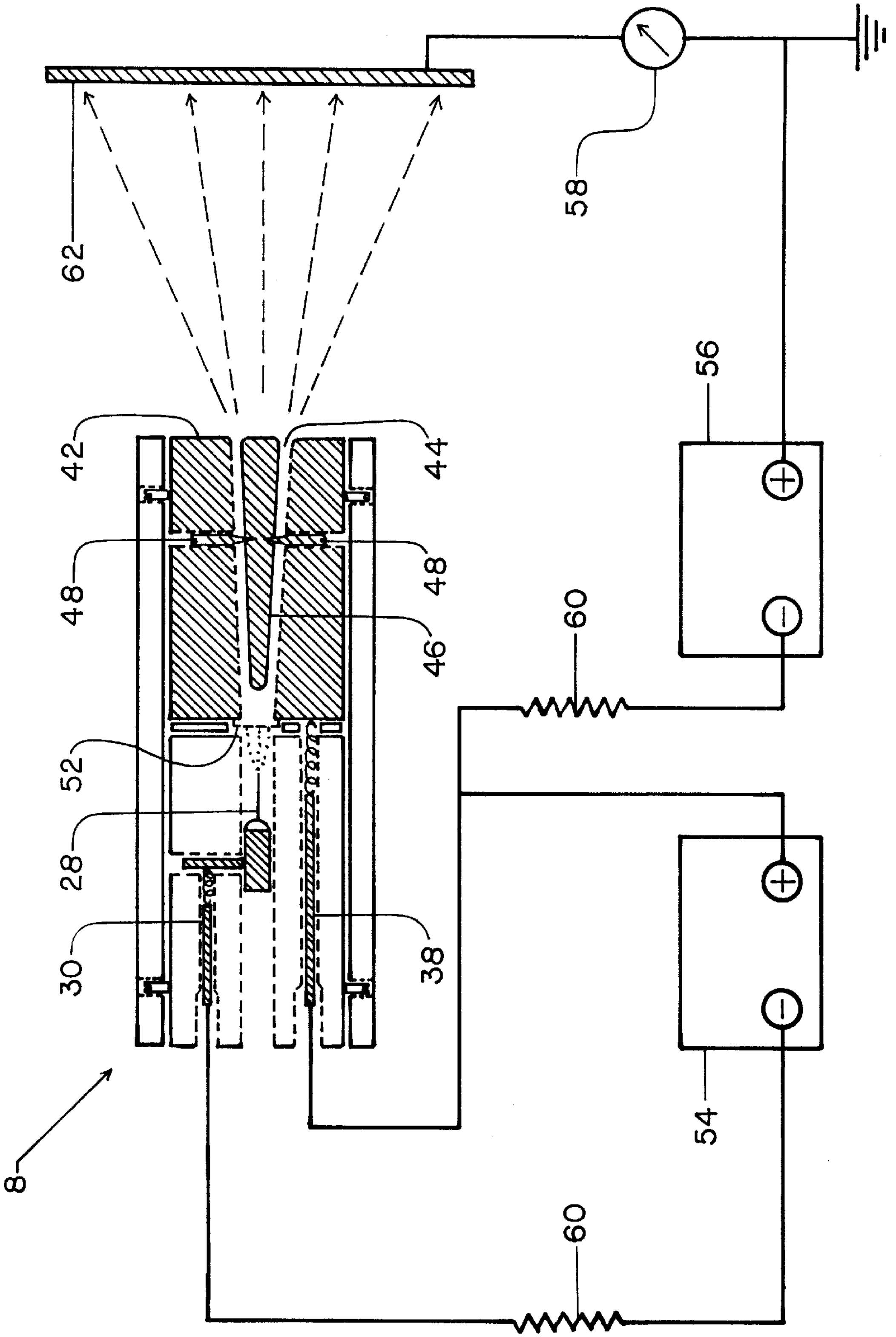
FIG. 2 is a cut-away elevational view of a preferred embodiment of the spray gun portion and electrical circuit diagram for the present invention.

Referring now to FIG. 2, a schematic diagram showing the electrical connections for the spray gun of the present invention is shown. Corona power supply 54 is attached to spray gun 8 in an electrical circuit, with its negative lead connected to longitudinal corona rod 30, and its positive lead connected to end piece rod 38. While this is the preferable method of connection, the poles of power supply 54 may also be reversed. Field power supply 56 is also attached to spray gun 8 in an electrical circuit, with its negative lead attached to end piece rod 38, and its positive lead attached to target 62. Target 62 may be a workpiece if the workpiece to be painted is constructed of a conductive material. If the workpiece is formed of an insulated material, target 62 may be a sheet of conductive material placed behind the workpiece.

Ballast resistors 60 are electrically connected between corona power supply 54 and longitudinal corona rod 30, and between field power supply 56 and end piece rod 38. Ballast resistors 60 serve to protect corona power supply 54 and field power supply 56 from overload by limiting the current drawn from corona power supply 54 and field power supply 56 to a specified maximum value, which is determined by the resistance of each ballast resistor 60. Nanoammeter 58 is used to measure the current imparted to target 62.

In an alternative embodiment, corona power supply 54 and field power supply 56 may be a single power supply. For example, a voltage divider could be used to provide power both to corona electrode 28 and end piece 42 from a single power supply, such devices and their operation being well known in the art.

To operate the present invention, corona power supply 54 and field power supply 56 are first activated. Aerosolized powder is directed from a powder source (not shown) into the proximal end of base powder passage 16. As aerosolized powder travels down base powder passage 16, it passes through corona tube 24 and flows around corona electrode 28 toward mesh screen 52. The activation of corona power supply 54 creates a strong electric field between the distal tip of corona electrode 28 and mesh screen 52; mesh screen 52 serves as an electrode in this circuit. Powder particles passing toward mesh screen 52 are thus charged by ion deposition while passing through this electric field. The electric field also results in a significant flow of free ions between corona electrode 28 and mesh screen 52.

As the powder particles reach mesh screen 52, their momentum causes them to pass through the holes in mesh screen 52 and enter end piece powder passage 44. The great majority of free ions originating from corona electrode 28 cannot pass through mesh screen 52 because of the electric field, and strike mesh screen 52. The free ions are attracted to mesh screen 52 because mesh screen 52 is a conductor with opposite charge to the free ions due to corona power supply 54. Any free ions that do pass through mesh screen 52 will strike end piece 42, baffle 46, or baffle set screws 48 before exiting end piece powder passage 44, since each of end piece 42, baffle 46, and baffle set screws 48 are conductors that are oppositely charged to the free ions due to the activation of corona power supply 54.

Charged powder particles flowing through end piece powder passage 44 are diffused by baffle 46 before exiting spray gun 8 at the distal end of end piece powder passage 44. Since the powder particles were charged by the passage between corona electrode 28 and mesh screen 42 with a charge now opposite to that induced upon target 62 as a result of field power supply 56, those particles are now electrostatically drawn to target 62. If target 62 is a conductive workpiece, then the particles are electrically drawn onto the surface of the workpiece itself. If the workpiece is insulated, then the charged power particles are drawn indirectly to the workpiece by placing the workpiece between spray gun 8 and target 62. By pointing spray gun 8 in the direction of target 62, the flow of air through spray gun 8 also serves to direct the powder particles toward target 62.

Figure 3:
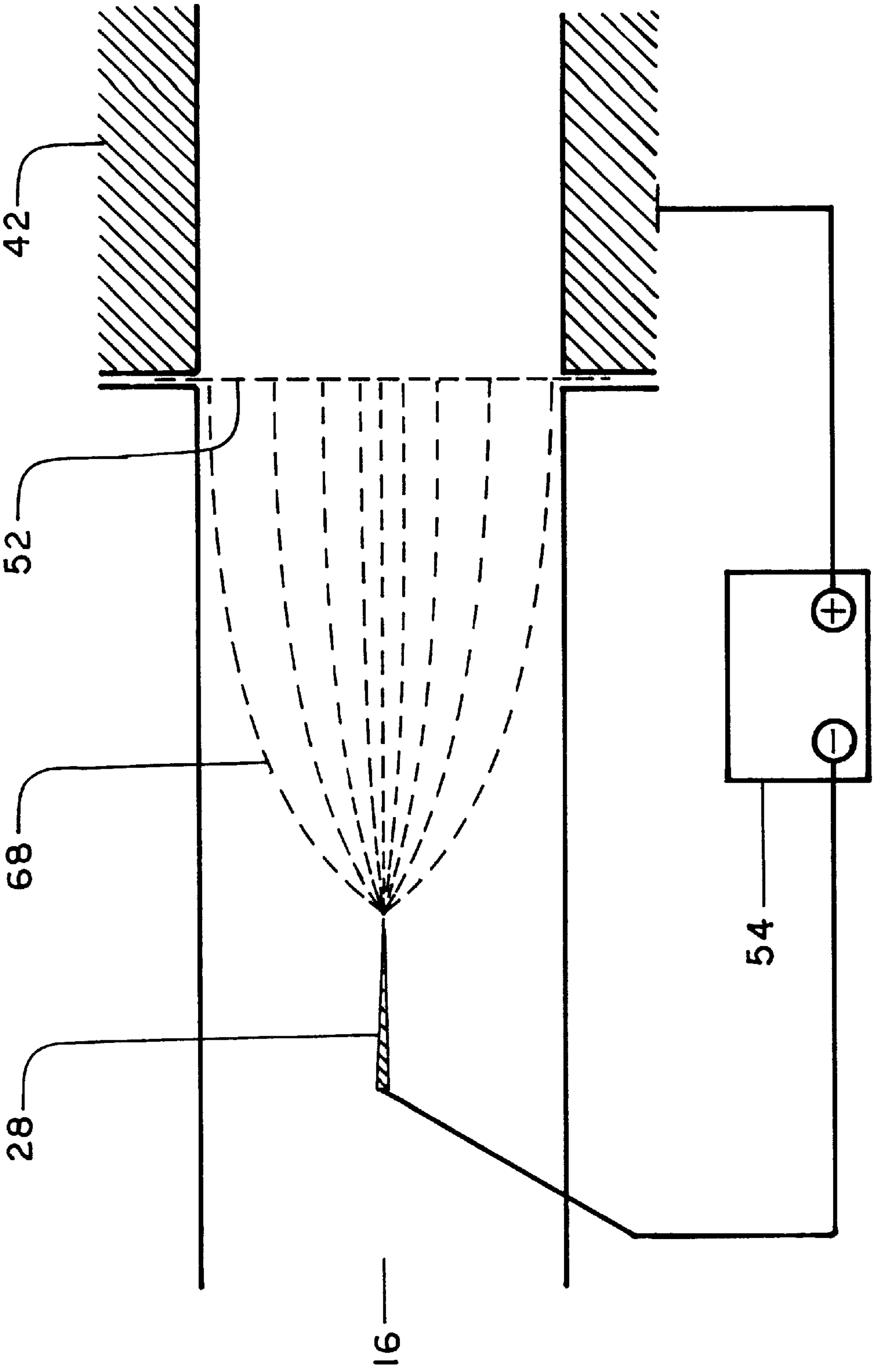
FIG. 3 is a diagram illustrating the corona discharge pattern in a preferred embodiment of the present invention.

Referring now to FIG. 3, a schematic diagram illustrating the electric field produced by the corona electrode 28 and mesh screen 52 of the present invention is shown. As illustrated by corona field lines 68, the electric field created between corona electrode 28 and mesh screen 52 is essentially parallel to the flow of powder through base powder passage 16. Thus powder flowing through base powder passage 16 spends more time in the intense electric field produced by corona electrode 28, and is necessarily charged more efficiently than in conventional low-voltage spray guns. Also, the path length in the electric field is longer for powder particles passing through base powder passage 16 near the center of the passage, where the most powder will flow. Thus the electric field illustrated by corona field lines 68 will impart efficient charging upon powder particles flowing through base powder passage 16 near the center of the passage, even though these particles have higher velocities than particles flowing through the passage near the wall of the passage.

Figure 4:
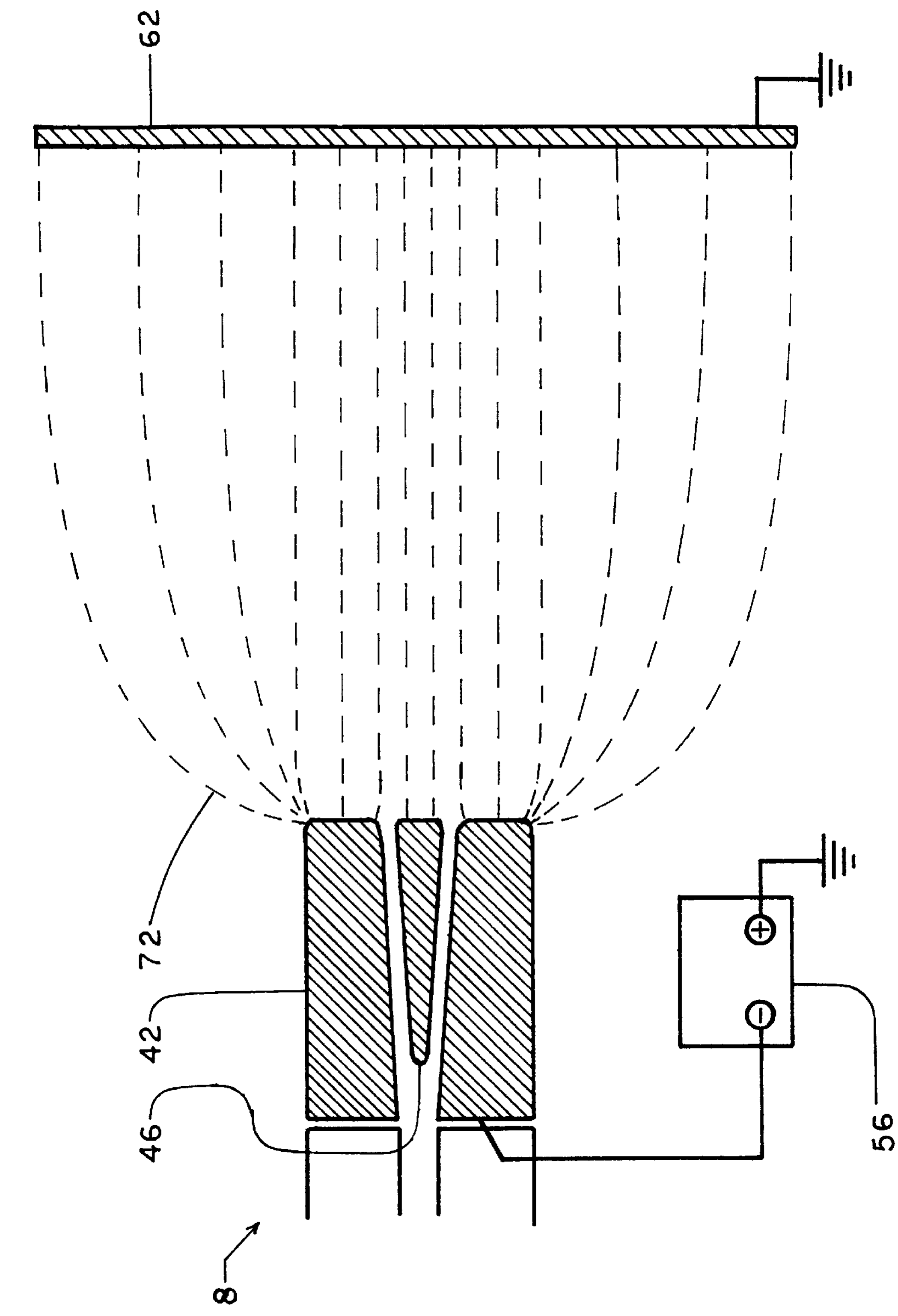
FIG. 4 is a diagram illustrating the electric field pattern between a spray gun according to a preferred embodiment of the present invention and a workpiece.

In FIG. 4, end piece field lines 72 are used to illustrate the electric field between the distal end of end piece 42 and baffle 46 of the present invention and target 62. Because end piece 42 and baffle 46 are conductors, charge imparted by field power supply 56 will accumulate on the distal end of spray gun 8. Thus the electric field between spray gun 8 and target 62, as illustrated by external end piece field lines 72, will be relatively smooth, without the stray electric field lines that result from charge buildup in the barrel of a traditional low-voltage spray gun.

Experiments were performed to determine the fraction of sprayed powder particles exiting spray gun 8 that were properly charged using the present invention. An electrodynamic curtain was used for this purpose, which consisted of 12 parallel, coplanar, steel wires 16.5 cm in length and 0.635 mm in diameter. The wires were spaced 2.0 cm apart to form a curtain measuring approximately 22 by 16.5 cm. The curtain was maintained at a DC potential of −2 kV with respect to earth ground, and an 8 kV peak-to-peak, 600 Hz, alternating potential was applied between adjacent wires. The DC potential applied to the curtain served to maintain the electric potential gradient from end piece 42 to target 62 so that charged particles were propelled electrically to the target even though the electrodynamic curtain was interposed between the spray gun 8 and target 62. Highly charged particles pass through the electrodynamic curtain and strike target 62, but uncharged particles, or particles with insufficient electrical charge, may impact wires of the curtain and be deposited thereon. The construction and use of the electrodynamic curtain is explained more fully in Masuda, S. and Matsumoto, Y., "Theoretical Characteristics of Standing-Wave Electric Curtains," Electrical Engineering in Japan, Vol. 93, No. 1, pp. 41–53 (1973), which is incorporated herein by reference.

In tests using the electrodynamic curtain, virtually all of the powder particles passing from sprayer gun 8 of the present invention reached target 62. However, with corona power supply 54 switched off so that corona electrode 28 exerted no electric field within base powder passage 16, the wires of the electrodynamic curtain became heavily coated with powder after only a few seconds of operation. These results thus indicate that a high percentage of powder particles passing through the present invention are well charged by the corona discharge from corona electrode 28.

Tests were also performed to quantitatively determine the electric charge of the powder particles passing through the present invention. This determination was made by integrating the current measured at nanoammeter 58 over the duration of each test period. The mass of the powder deposited on target 62 was found by weighing target 62 before and after each test. The charge-to-mass ratio (Q/M) of the deposited powder was then computed by dividing the measured powder charge by the measured powder mass. The parameters used in these tests are shown in Table 1 below

TABLE 1

Charge-to-Mass Ratio Test Parameters

| | |
|---|---|
| flow channel diameter: | 6 mm |
| air flow speed: | 4–10 m/s |
| sample powder: | talc (particle size of 5–50 μm) |
| target distance: | 20 cm |
| corona current: | 20–50 μA |
| target: | copper-clad insulating board (9 × 15 cm) |

Several tests were performed, using different voltages at the corona power supply 54 and field power supply 56. The results of each test are shown in Table 2 below:

TABLE 2

Charge-to-Mass Ratio Test Results

| field power supply (kV) | corona power supply (kV) | time(s) | current to target (μA) | powder charge (μC) | powder mass (gm) | Q/M (μC/gm) |
|---|---|---|---|---|---|---|
| −4 | −16 | 61 | −0.10 | −6.1 | .90 | −6.7 |
| −4 | −16 | 63 | −0.10 | −6.3 | 1.25 | -5.0 |
| −6 | −14 | 25 | −0.15 | −3.7 | 0.50 | −7.4 |
| −6 | −14 | 29 | −0.18 | −5.2 | 0.53 | −9.8 |
| −7 | −13 | 48 | −0.12 | −5.7 | 0.74 | −7.8 |

As can be seen from Table 2, the charge-to-mass ratio of powder deposited on target 62 is consistently 5 μC/gm or more. This suggests that particles are being charged to near saturation levels in the corona discharge so that small changes in operating conditions do not affect the charge-to-mass ratio to a large extent. These charge levels are greater than or equal to those achieved in conventional spray systems and are sufficient for good adhesion of powder particles to the surface of the workpiece.

It also appears from these results that positive and negative coronas are equally effective in charging the powder particles. Thus the system can easily be set to complement by corona charge any tribocharge which might exist on the powder particles when they enter the powder sprayer 8 of the present invention.

Finally, it appears that almost all of the powder that leaves the powder sprayer 8 finds its way to target 62, resulting in a high efficiency for the present invention in delivering powder to the workpiece.

A similar series of tests to measure the charge-to-mass ratio of powder particles were performed for the conventional low-voltage system. The initial parameters for these tests were identical to those listed above for the tests of the preferred embodiment of the present invention. Observation during these tests revealed that powder spray from the low-voltage spray gun was not well focused toward target 62, and a considerable amount of powder was deposited on surfaces other than target 62. The charge-to-mass test results for the low-voltage spray gun are shown in Table 3:

TABLE 3

Charge-to-Mass Ratio Test Results for Low-Voltage Gun

| corona power supply (kV) | time(s) | current to target (μA) | powder charge (μC) | powder mass (gm) | Q/M (μC/gm) |
|---|---|---|---|---|---|
| −15 | 63 | −0.015 | 0.95 | .63 | −1.5 |
| −15 | 63 | −0.02 | 1.30 | .72 | −1.8 |

As demonstrated by the data of Tables 2 and 3, the present invention charged powder particles to levels three to four times higher than the conventional low-voltage system. Also, powders deposited on target 62 in tests with the present invention were qualitatively smoother and more evenly distributed than powders deposited in tests of the conventional low-voltage system.

It should be understood that the theories of operation provided herein may be incomplete or inaccurate without limiting the results described and the invention claimed below. The present invention has been described with reference to certain preferred and alternative embodiments which are intended to be exemplary only and not limiting to the full scope of the present invention as set forth in the appended claims.

I claim:

1. A powder charger and sprayer, comprising:

(a) a powder passageway;

(b) a corona discharge tip fixed within said passageway;

(c) a conducting screen fixed within said passageway downstream from said tip; and (d) a corona power supply connected to said tip and said screen.

2. The powder charger and sprayer of claim 1, further comprising a conducting end piece within said passageway, wherein said end piece comprises a passage for powder flow and said screen crosses said end piece passage.

3. The power charger and sprayer of claim 2, further comprising an external power supply connected to said conductor and the workpiece.

4. The power charger and sprayer of claim 3, further comprising a conducting baffle downstream from said screen and within said end piece passage.

5. The powder charger and sprayer of claim 2, wherein said screen is positioned sufficiently far from said tip such that the electric field between said tip and said screen runs essentially parallel to the direction of powder flow within said powder passageway.

6. The powder charger and sprayer of claim 4, wherein said corona power supply and said external power supply comprise a single power source.

7. A method of charging and spraying powder, comprising the steps of:

(a) introducing a pressurized gas laden with a powder into a passageway;

(b) charging the powder by passing the powder down the passageway past a corona discharge tip fixed within the passageway and then past a conducting screen fixed within the passageway downstream from the tip; and (c) spraying the powder onto a workpiece by pointing the passageway toward the workpiece.

8. The method of claim 7, wherein said charging step further comprises passing the powder through a conducting end piece downstream from the screen.

9. The method of claim 8, further comprising the step of applying a voltage drop between the end piece and the workpiece.

10. The method of claim 9, wherein said charging step further comprises passing the powder past a conducting baffle downstream from said screen and within the end piece passage.

11. The method of claim 8, wherein the screen is positioned sufficiently far from the tip such that the electric field between the tip and the screen runs essentially parallel to the direction of powder flow within the passageway.

12. The method of claim 10, wherein said charging step and said step of applying a voltage drop between the end piece and the workpiece are performed using a single power supply.

* * * * *